Figure 1:
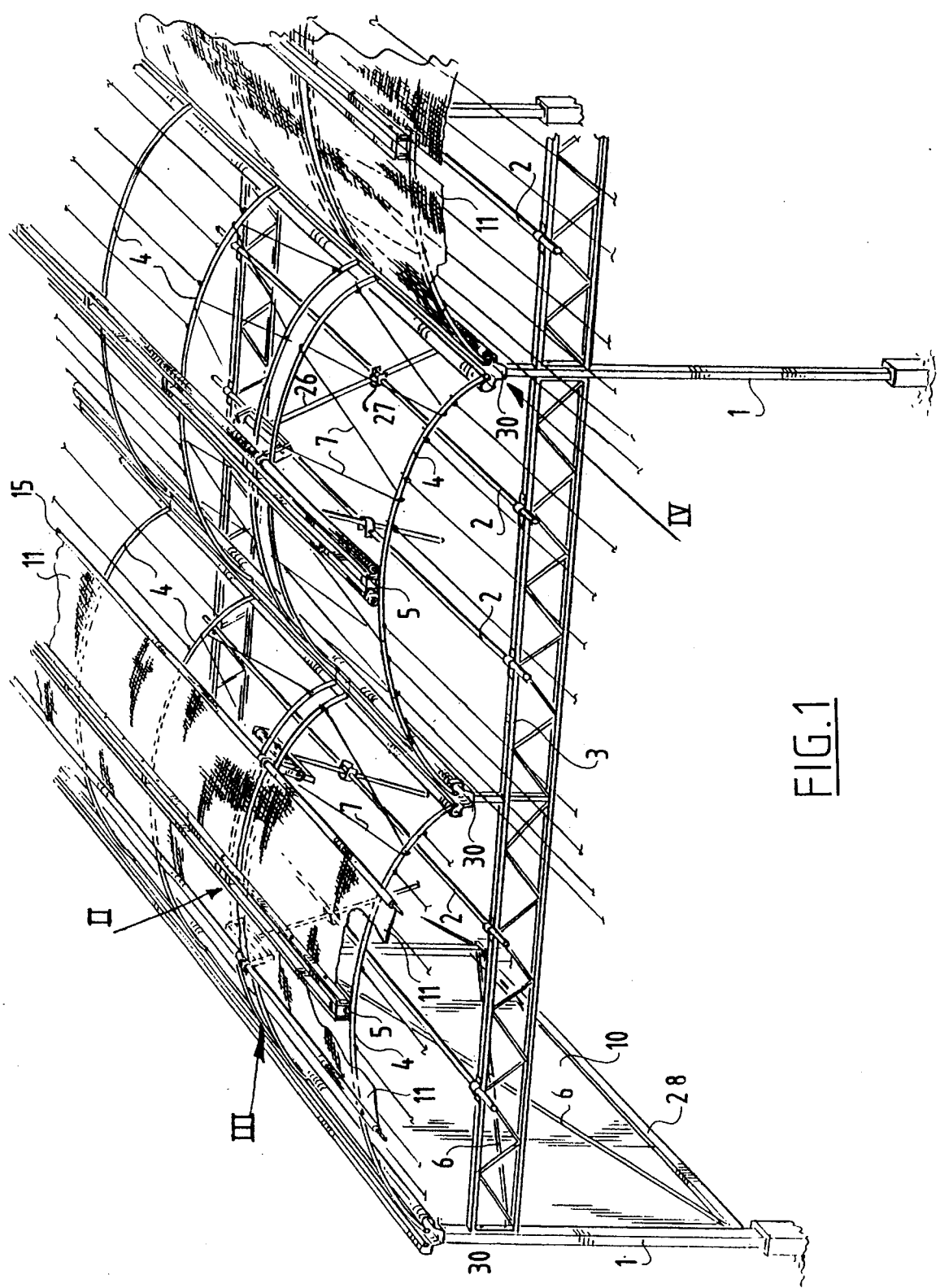

United States Patent [19]
Vermeulen

[11] Patent Number: 5,564,234
[45] Date of Patent: Oct. 15, 1996

[54] BUILDING STRUCTURE CONSISTING OF A FRAMEWORK OF UPRIGHTS AND BEAMS COVERED WITH A FOIL

[75] Inventor: Arnoldus H. A. Vermeulen, Terheijden, Netherlands

[73] Assignee: Rolloos Sørensen B.V., Raamsdonksveer, Netherlands

[21] Appl. No.: 182,949

[22] Filed: Jan. 13, 1994

[51] Int. Cl.$^6$ .................................................. E04H 1/12
[52] U.S. Cl. .................................. 52/63; 52/222; 296/98; 135/115; 135/119
[58] Field of Search .................................. 135/124, 115, 135/119; 52/63, 222; 296/98; 160/242, 243, 310

[56] References Cited

U.S. PATENT DOCUMENTS

| | | | |
|---|---|---|---|
| 2,693,195 | 11/1954 | Frieder et al. | 135/124 X |
| 4,505,512 | 3/1985 | Schmeichel et al. | 135/119 X |
| 4,596,093 | 6/1986 | Esposito | 160/310 X |
| 4,673,208 | 6/1987 | Tsukamoto | 296/98 |
| 4,795,206 | 1/1989 | Adams | 296/98 |
| 4,915,439 | 4/1990 | Cramaro | 296/98 |
| 5,038,517 | 8/1991 | Talbott . | |
| 5,197,238 | 3/1993 | Peleg | 52/222 X |
| 5,275,459 | 1/1994 | Haddad, Jr. | 296/98 X |

FOREIGN PATENT DOCUMENTS

| | | |
|---|---|---|
| 1526572 | 5/1968 | France . |
| 2494957 | 2/1981 | France . |

*Primary Examiner*—Lanna Mai
*Attorney, Agent, or Firm*—Evenson, McKeown, Edwards & Lenahan, P.L.L.C.

[57] ABSTRACT

A building structure consisting of a framework of uprights and beams of profile material which is covered on the outside with sheet-like material such as plastic foil, wherein on at least the roof portion of the framework the foil is fixed with a longitudinal edge to a longitudinal beam connected to the framework and wherein a second longitudinal beam is fastened to the parallel opposite longitudinal edge of the foil and is driven for rotation on the central axis thereof such that the second beam winds itself into respectively out of the foil, such that opening and closing of said roof or wall portion of the foil covering can take place easily and under tension.

9 Claims, 4 Drawing Sheets

BUILDING STRUCTURE CONSISTING OF A FRAMEWORK OF UPRIGHTS AND BEAMS COVERED WITH A FOIL

The invention relates to a building structure consisting of a framework of uprights and beams of profile material which is covered on the outside with sheet-like material such as plastic foil.

Such structures are often used for greenhouse construction in the market gardening sector. The sheet-like plastic foil must be seen herein as replacement for the traditional glass covering. The foil must therein be stretched tightly over the framework in order to make the foil wind-resistant. On the other hand, it must also be possible to lift a portion of the foil in the roof or side wall in order to enable ventilation of the greenhouse at summer temperatures. When the foil is stretched tight, the releasing and sliding off of the foil is a problem because it then once again becomes sensitive to wind.

The invention has for its object to improve a building structure of the type described in the preamble by providing a mechanism with which opening of a roof or wall portion of the foil covering can take place easily and under tension, whereby the above stated drawbacks are obviated.

The building structure according to the invention is distinguished in that on at least the roof portion of the framework the foil is fixed with a longitudinal edge to a longitudinal beam connected to the framework, wherein a second longitudinal beam is fastened to the parallel opposite longitudinal edge of the foil and is driven for rotation on the central axis thereof such that the second beam winds itself respectively into and out of the foil.

Due to the rotatably driven second longitudinal beam, the foil can remain tightly stretched on the remaining roof or wall portion or can even be rolled up entirely so that no loose foil parts are formed which can be caught by the wind. Covering of the framework can take place in reverse manner by driving the longitudinal beam in opposing sense and winding it out of the foil, whereby the latter is tensioned again over the framework. The foil remains under tension because of the weight of the longitudinal beam.

It is recommended to make the width dimension of the foil greater than the length of the transverse frame members, wherein the lower edge of the roof surface formed by the longitudinal beams overhangs above the support thereof. This offers the advantage that when the second longitudinal beam is wholly unrolled it will begin to roll up again, but on the opposite side of the foil, whereby the longitudinal beam can nestle under the overhanging portion of the roof and can pull the foil taut. This avoids possible damage as a consequence of wind, since the foil is pulled firmly onto the longitudinal beams.

According to a further embodiment of the invention the support of the longitudinal beams can be a part of a drainage gutter profile.

In one embodiment the invention proposes to embody the drive of the second longitudinal beam as a reversible electric motor which is mounted in a sub-frame joined to the longitudinal beam. This provides the advantage that the drive is always situated under the roof covering, even when it is partially rolled up.

Figure 2:
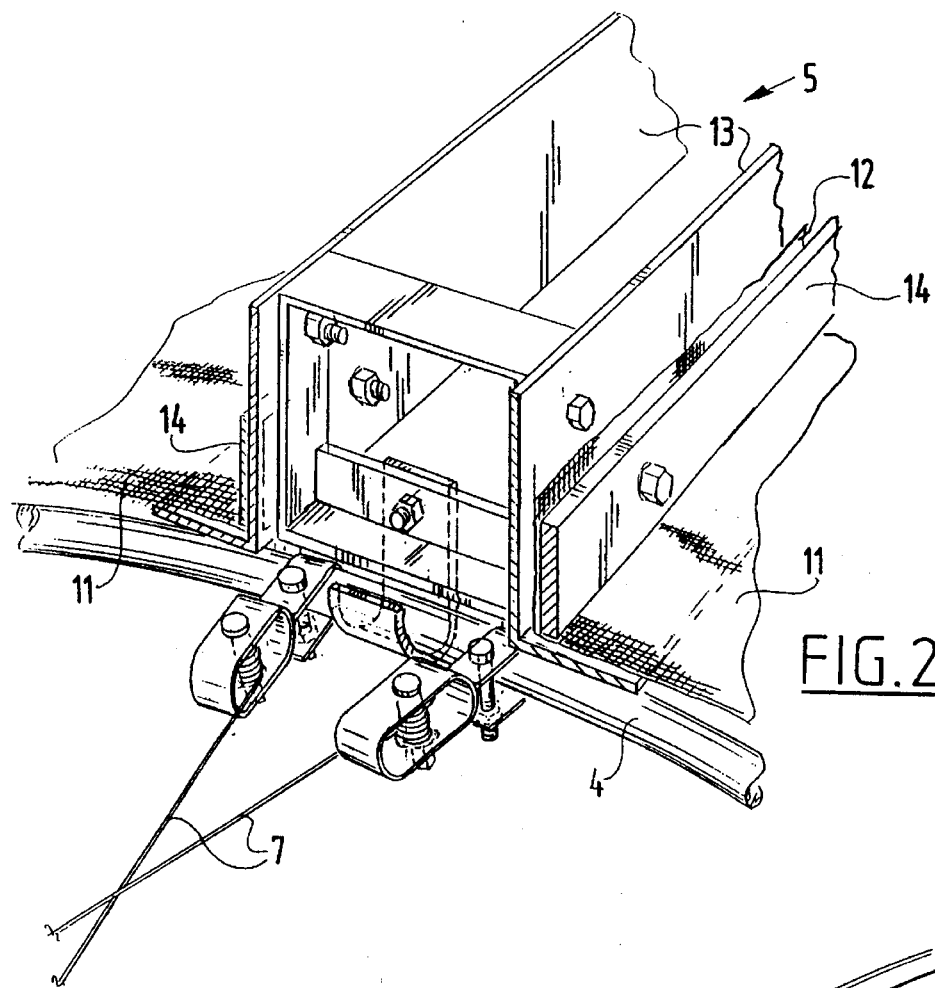
Figure 3:
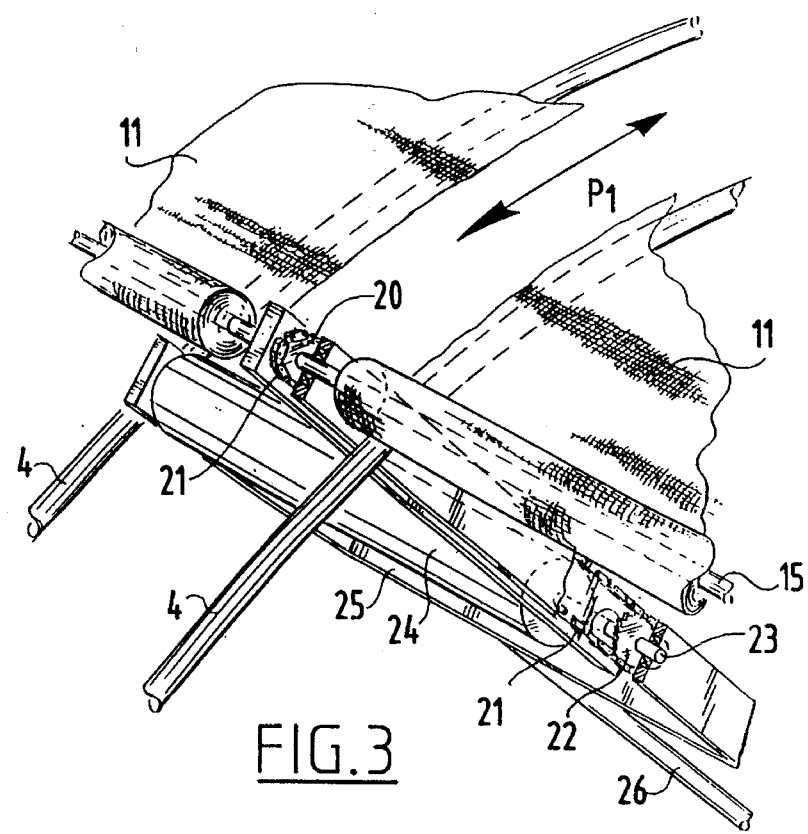
Figure 4:
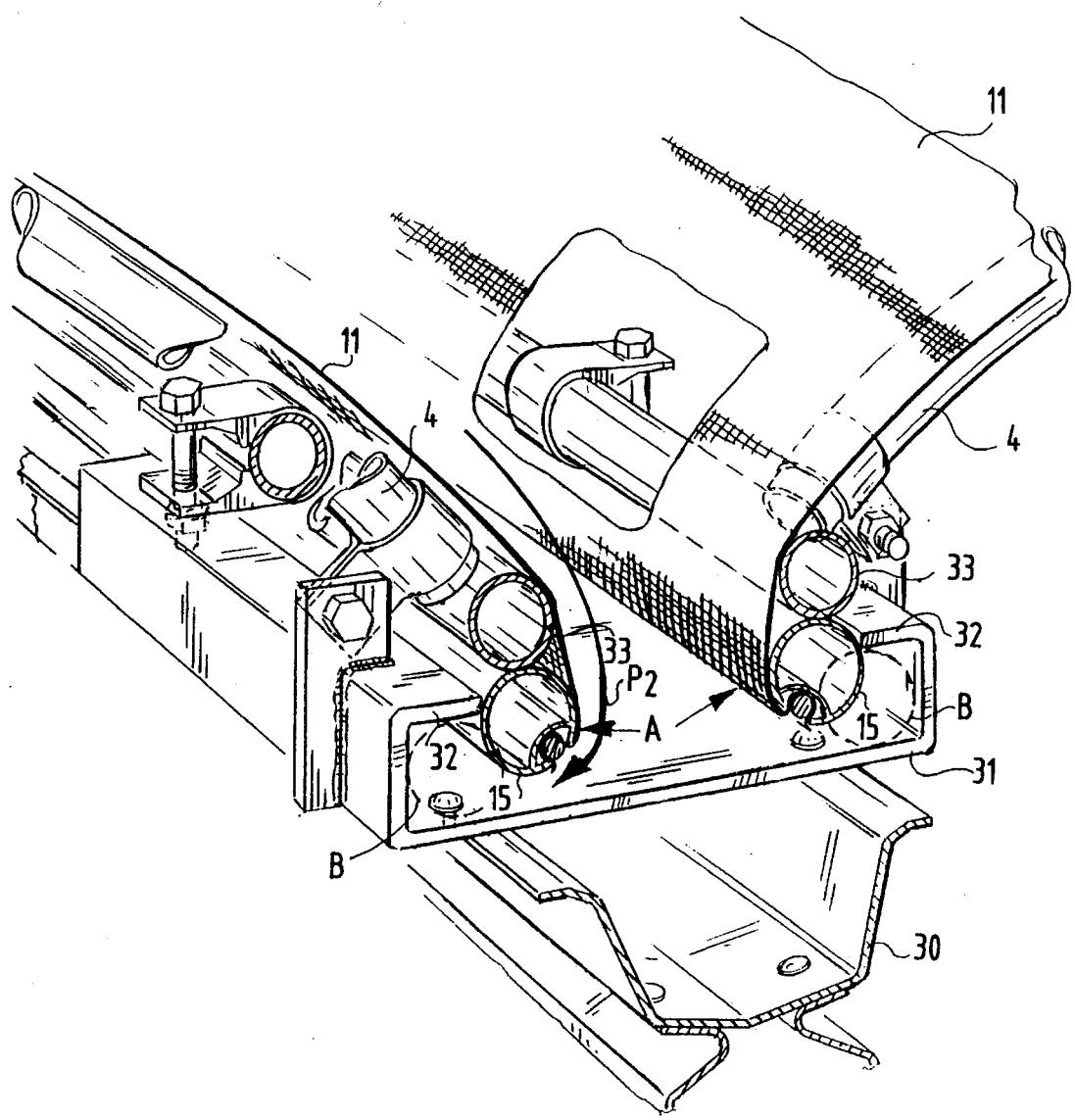
Figure 5:
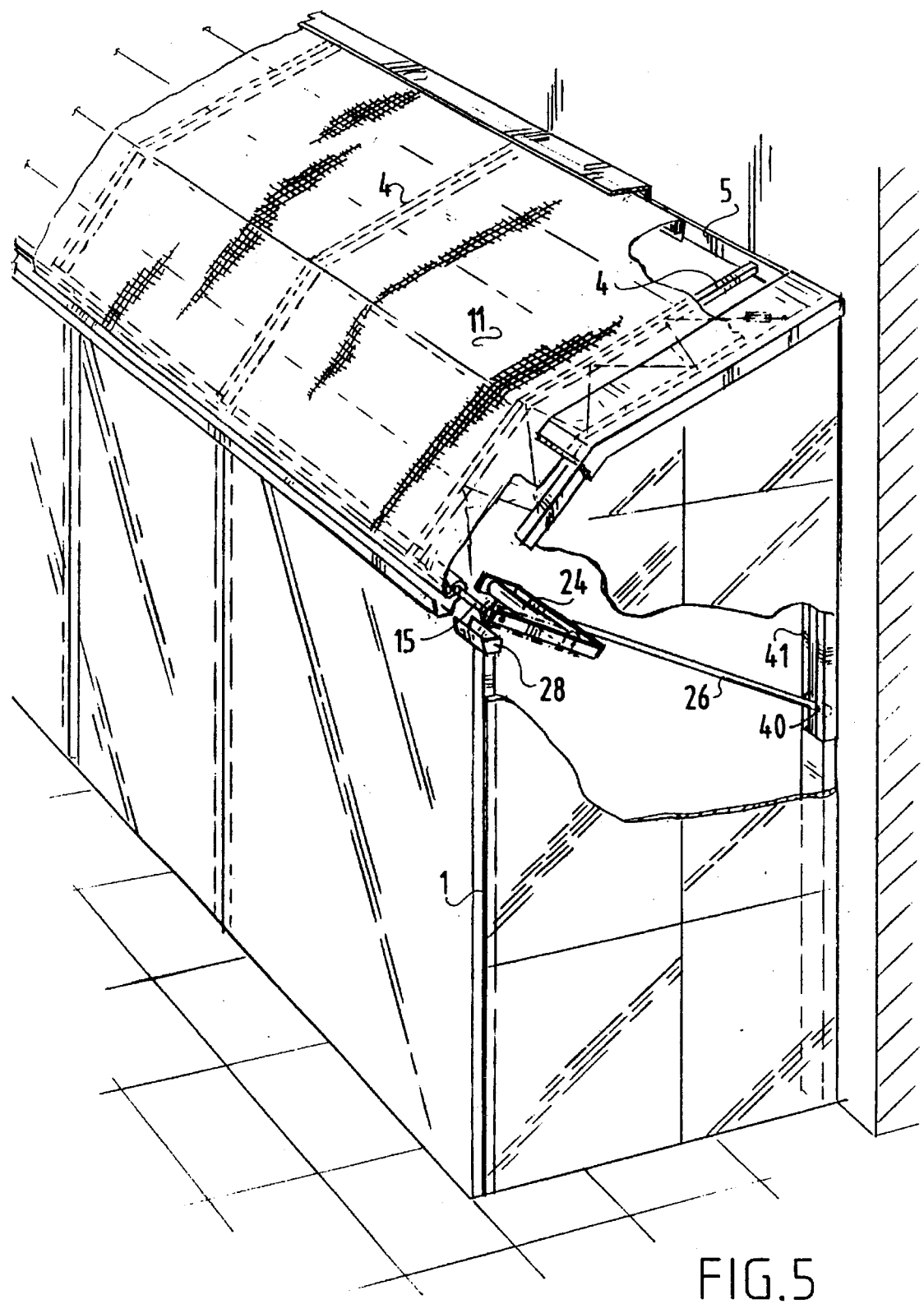

Above mentioned and other features will be further elucidated in the figure description hereinbelow of a number of embodiments. In the drawing:

FIG. 1 shows a perspective top view of a building structure according to the invention, FIG. 2 shows a perspective view along the arrow II of a detail of the ridge construction of a part of the framework of FIG. 1, FIG. 3 is a perspective view along the arrow III in FIG. 1 of a part of the drive of the second longitudinal beam with foil wound thereon, FIG. 4 shows a perspective view along the arrow IV wherein the winding and tensioning function of the second beam is further elucidated, FIG. 5 shows a perspective view of a second embodiment of a building structure according to the invention.

The building structure shown in FIG. 1 consists of a framework or assembly of uprights 1, longitudinal and cross beams 2, 3 respectively, in addition to curved transverse frame members 4 onto the highest point of which is fixed a longitudinal beam 5. All these components are formed from profile material or composite profile material.

If desired, cross bracing can be arranged which can be formed by rods 6, on the left in FIG. 1, or tensioning wires 7 between the curved transverse frame members 4.

According to the invention, the outside of the framework is covered with plastic foil as designated with 10 along the side panels of the framework and with 11 on the roof part.

With reference to FIGS. 1–4 the manner of fastening and rolling up the cover foil 11 for the roof part is now further elucidated.

The foil 11 is fixedly attached with a longitudinal edge 12 to the roof longitudinal beam 5, see FIG. 2, which beam consists here of two L-shaped profiles 13 held at a mutual distance, the bottom flange of which is fixed to the curved transverse frame member 4. Longitudinal edge 12 is clamped fixedly by means of a clamping strip 14 against the long side of profile 13.

The foil material 11 has a length which corresponds with a part or the whole length of the building structure to be spanned as well as a width which at least corresponds with half the length of the curved transverse frame member 4 of the framework.

The free edge strip of the foil 11, which is parallel to the edge strip 12 and is situated in the covering situation close to the lower end of the curved transverse frame members 4, is fixed to a second longitudinal beam in the form of a rod or pipe 15, see also FIG. 3, which is driven rotatably on the central axis thereof, which is further elucidated hereinafter, such that the rod can wind itself into respectively out of the foil covering 11. It is thus possible to roll up half the span of a transverse frame member 4 from the lower side to the first longitudinal beam 5 and to unroll it again in reverse sense to cover the framework.

Reference is made for the driving to FIG. 3 in which can be seen that the foil covering 11 is discontinued locally wherein two closely adjoining transverse frame members 4 are arranged. In the space between the transverse frame members 4, the free second longitudinal beam 15 is embodied with a chain wheel or transmission gear 20 around which is trained a chain 21. This leads to a second chain wheel 22 on the output motor shaft 23 of an electric motor 24. This latter is fixed into a sub-frame 25 in the form of a U-shaped bracket to which is fixed a reaction rod 26. This latter is connected via a sliding connection 27 to a longitudinal beam 2 of the framework. These elements are embodied such that the reaction rod 26 can slide transversely of the longitudinal beam 2 when the sub-frame 25 moves along the underside of the curved transverse frame member 4.

This movement is effected by a suitable energizing of the motor 24 in, the one or other rotation direction, whereby via the chain transmission 21, the wheel 20 is set into rotation, and thus also the rod 15. Depending on the rotational direction the rod will therefore wind itself respectively into and out of the foil covering 11 in the direction of the arrow P1, see FIG. 3.

Since the intersection of the reaction rod 26 with the associated longitudinal beam 2 is not situated exactly in the middle of the curvature of the transverse frame member 4, the distance between the motor 24 and the relevant longitudinal beam 2 will change during displacement, whereby the reaction rod 26 thus must be able to slide along longitudinal beam 2. The chosen construction enables the motor with drive to be situated under the foil covering 11 in the majority of the covering positions of the foil over the framework, whereby the construction is protected against weather influences.

It is noted that the gap between the two mutually adjacent transverse frame members 4 can be covered with a roof covering (not shown).

Within the scope of the invention other drive constructions are possible, for instance a manual drive or one wherein a central motor can be envisaged which is connected via a cable, chain system to the different second longitudinal beams 15 in order to drive these in the one or other rotational direction.

In order to pull the foil tightly over the curved transverse frame members or trusses 4 it is recommended to embody the bottom edge construction of the covering close to the interposed gutter profiles 30 such that the bottom edge overhangs the gutter profile 30, see FIG. 4. This overhang is realized by providing the gutter profile 30 on the top with a bracket 31, on the free end 32 of which is fixed a tube 33. The lower ends of the frame members 4 end on this tube 33.

When the second longitudinal beam 15 is unrolled from the foil 11 in the direction of arrow P2, the tube 15 will, with a sufficient width of the foil 11, descend beyond tube 33 into the position designated with A in FIG. 4. By continuing to rotate the longitudinal beam 15 in the same direction P2 the tube will wind itself into the other side of the foil and finally clamp itself fast adjacently of the longitudinal tube 33 into the position designated with B in FIG. 4. In this manner the foil covering 11 is pulled taut over the fixed longitudinal tube 33 and the foil comes to rest firmly, without play, on the transverse frame members 4. An exceptionally wind-resistant construction is herewith obtained.

Release of the foil and the winding up thereof takes place by driving the longitudinal beam 15 in reverse direction, whereby first the position A is reached and rolling up subsequently begins to open the roof part of the building structure.

FIG. 5 shows an embodiment wherein the building structure is joined to an existing structure of another type. The building structure also consists here of uprights 1 and longitudinal beams 2, for instance in the form of a rainwater gutter and a fixed longitudinal beam 5, which is fixed to the gable of the existing building. The transverse frame members 4 here take a bent form and extend between the longitudinal beams 2 and 5. A loose second longitudinal beam 15 is again fastened to the free lower end of a covering foil 11 and is driven by a motor 24 as according to the above described drive mechanism. A reaction rod 26 runs with a carriage 40 in a carriage guide 41 which is fixed to the gable of the existing building.

The lower end of the transverse frame members 4 is here also designed such that it overhangs the gutter profile 2, whereby a method of tensioning the foil 11 can be obtained corresponding with FIG. 4. The action of rolling up and unrolling the foil otherwise corresponds with the above described system referred to in FIG. 1.

I claim:

1. A building structure comprising a framework of uprights and beams of profile material which is covered on the outside with sheet-like material such as plastic foil, said framework includes a roof portion, wherein on at least the roof portion the foil is fixed with a longitudinal edge to a longitudinal beam connected to the framework, wherein a second longitudinal beam is fastened to the parallel opposite longitudinal edge of the foil and is driven for rotation on the central axis thereof such that the second beam winds itself into and out of the foil;

wherein a width dimension of the foil is greater than a length of transverse frame members extending from the longitudinal beam to lower ends thereof, and a lower edge of a roof surface formed by the longitudinal beams overhangs above a support bracket to pull the foil taut over the transverse frame members; and wherein the support bracket is a Dart of a drainage gutter profile arranged on an edge of the roof portion.

2. A building structure as claimed in claim 1, wherein the longitudinal beam is arranged on the highest point of the roof portion.

3. A building structure as claimed in claim 2, wherein the transverse frame members which support the longitudinal beam have a curved form.

4. A building structure as claimed in claim 2, wherein the drive of the second longitudinal beam is a reversible electric motor which is mounted in a sub-frame joined to the second longitudinal beam.

5. A building structure as claimed in claim 1, wherein the transverse frame members which support the longitudinal beam, and are arranged transverse thereto, have a curved form.

6. A building structure as claimed in claim 5, wherein the drive of the second longitudinal beam is a reversible electric motor which is mounted in a sub-frame joined to the second longitudinal beam.

7. A building structure as claimed in claim 1, wherein the drive of the second longitudinal beam is a reversible electric motor which is mounted in a sub-frame joined to the second longitudinal beam.

8. Building structure as claimed in claim 7, wherein between the electric motor and the longitudinal beam is arranged a transmission, preferably in the form of a chain which is trained round a transmission gear connected to the longitudinal beam.

9. A building structure comprising:

a framework including a roof framework, said roof framework comprising transverse frame members connected to a first longitudinal beam and to a bracket support forming a part of a drainage gutter profile arranged at a lower end of the transverse frame members;

a roof surface formed of a cover sheet material having a first longitudinal edge fixedly connected to the first longitudinal beam, the cover sheet material having a width dimension greater than a length dimension of the transverse frame members;

a second longitudinal beam fastened to an opposite, parallel arranged second longitudinal edge of the cover sheet material, the second longitudinal beam being rotatably driven around a central axis thereof to wind-up and unwind the cover sheet material into an opened and closed position;

wherein in the closed position the second longitudinal beam is clamped against an underside of the bracket support by a continued rotation thereof past lower edges of the transverse frame members such that the roof surface extends beyond the transverse frame members in order to pull taut the cover sheet material over the roof framework, whereby wind resistance is increased.

* * * * *